(12) United States Patent
Haagenson et al.

(10) Patent No.: US 9,733,446 B1
(45) Date of Patent: Aug. 15, 2017

(54) FREEZE PROTECTION THROUGH VOLUME DONATION

(71) Applicants: Steven Haagenson, Fairbanks, AK (US); John Huber, Jr., Fairbanks, AK (US)

(72) Inventors: Steven Haagenson, Fairbanks, AK (US); John Huber, Jr., Fairbanks, AK (US)

(*) Notice: Subject to any disclaimer, the term of this patent is extended or adjusted under 35 U.S.C. 154(b) by 0 days.

(21) Appl. No.: 15/160,344

(22) Filed: May 20, 2016

(51) Int. Cl.
| | | |
|---|---|---|
| *E03B 7/10* | (2006.01) | |
| *F16L 57/00* | (2006.01) | |
| *G02B 6/44* | (2006.01) | |
| *H02G 3/04* | (2006.01) | |
| *H01B 9/00* | (2006.01) | |

(52) U.S. Cl.
CPC ............ *G02B 6/4496* (2013.01); *E03B 7/10* (2013.01); *F16L 57/00* (2013.01); *G02B 6/4465* (2013.01); *G02B 6/4494* (2013.01); *H01B 9/003* (2013.01); *H01B 9/005* (2013.01); *H02G 3/0406* (2013.01); *H02G 3/0481* (2013.01)

(58) Field of Classification Search
None
See application file for complete search history.

(56) References Cited

U.S. PATENT DOCUMENTS

| | | | |
|---|---|---|---|
| 1,801,500 A | 4/1931 | Gottwald | |
| 3,120,947 A | 2/1964 | Hamrick | |
| 3,244,402 A | 4/1966 | Ensley | |
| 3,473,339 A | 10/1969 | Schlafly | |
| 4,443,019 A | 4/1984 | Ishido | |
| 5,092,375 A | 3/1992 | Landers | |
| 5,157,752 A * | 10/1992 | Greveling | G02B 6/4494 385/109 |
| 5,172,730 A | 12/1992 | Driver | |
| 5,740,295 A * | 4/1998 | Kinard | G02B 6/441 385/103 |
| 6,464,229 B1 | 10/2002 | Kogler | |
| 7,515,795 B2 * | 4/2009 | Overton | G02B 6/4494 385/100 |
| 7,650,911 B2 | 1/2010 | Follett | |
| 9,273,816 B2 * | 3/2016 | Emerson | G02B 6/4496 |
| 2007/0297730 A1 * | 12/2007 | Bringuier | G02B 6/4494 385/113 |

* cited by examiner

*Primary Examiner* — Dimary Lopez Cruz
(74) *Attorney, Agent, or Firm* — Brian S. Steinberger; Law Offices of Brian S. Steinberger, P.A.

(57) ABSTRACT

Devices, systems and methods to prevent damage to power and communication conductors located in cold occurring regions, with an elongated cylindrical tubular assembly of closed cell foam within an outer non-conductive durable outer coating, with a pull cord extending therethrough, wherein the assembly along with communication and power lines is pulled through new power and communication ducts and conduits and in retrofitting existing power and communication ducts, so that the assembly reduces the volume spacing in the ducts/conduits that can be damaged by water intrusion which expands during freeze conditions.

10 Claims, 8 Drawing Sheets

W = WATER IN DUCT

FIG. 9

FW = FROZEN WATER IN DUCT (ICE)

FREEZE PROTECTION THROUGH VOLUME DONATION

FIELD OF INVENTION

This invention relates to freeze damage protection of power and communication ducts and conduits, and in particular to devices, systems and methods to prevent damage to power and communication conductors located in cold occurring regions, with an elongated cylindrical tubular assembly of closed cell foam within an outer non-conductive durable outer coating, with a pull cord extending therethrough, wherein the assembly is pulled through new power and communication ducts and conduits and in retrofitting existing power and communication ducts, wherein the assembly reduces the volume spacing in the ducts/conduits that can be damaged by water intrusion which expands during freeze conditions.

BACKGROUND AND PRIOR ART

Pressures exerted by the expansion of freezing water within duct or conduit installations and their associated vaults or enclosures can be extreme. These pressures have been calculated to reach upward of 60,000 psi, which is equivalent to the pressures commonly encountered in large caliber rifle chambers when firing a cartridge.

Utilities in northern temperate, sub-arctic and arctic regions such as the northern contiguous United States, Canada and Alaska (and other similar regions worldwide) have tried for many years to devise techniques to prevent damage to power and communication conductors and equipment that are installed within duct/vault systems.

Generally, conductors are installed in conduits or duct systems for mechanical protection from the environment. Ducts and conduits allow for possible replacement after a conductor failure when the ground is frozen or without disturbing the surface area above the duct or conduit. Conductors installed in underground ducts are generally classified as being installed in wet locations. However, electrical rigid metal conduits do not have tapered threads and when installed, are not watertight.

While the air pressure within installed conduits and ducts is basically 0 psi gauge, ground water pressure is always higher. Water will force in through couplings, expansion joints or other duct connections. Water also enters ducts, vaults or enclosures by infiltration or flooding from the surface or will flood in or infiltrate through the open conduit ends. Once in the conduit or duct system, water fills the voids between the conductors within the conduit.

During winter months surrounding ground freezes down to or beyond a depth of 6 to 7 feet depending upon geographic location. Conduits are typically placed from 24 to 42 inches below grade, which is well within the freeze depth. As the ground freezes around the conduit, it forms a layer of frozen soil around the conduit that can approach the strength of concrete. As the ground continues to freeze, the water at the ends and inside the conduit also starts to freeze, capturing liquid water in the conduit.

As water continues to freeze in these confined spaces, the pressure increases due to the expansion of water as it changes to ice. If the conduit/duct is above ground, the conduit will rupture from the high pressure. When the conduit is in frozen ground the strength of the conduit is greatly increased by the surrounding frozen earth which allows the pressure inside the conduit to reach extremely high pressures. As these high pressures increase, the pressure is applied to the conductors, which causes deformation and failure of the conductor insulation. Driven by increasing pressure, expanding ice (which is bonded to the conductor insulation) attempts to flow along the duct or conduit seeking the necessary volume dictated by its change of state from water to ice. At typical pressure, that necessary additional volume can only be found at the conduit or duct ends of the installed system, which results in insulation and/or conductor failure.

Some techniques have been attempted to protect conductors in conduits or ducts located within frozen ground or free air from damage caused by the expanding frozen water. These techniques range from keeping the water out, using heat and other chemicals, and displacing the water with another material.

Attempting to keep the water out is commonly called the submarine approach. Keeping water out of a conduit system can be extremely difficult unless all water entry points are sealed and continuous maintenance methods are strictly assured and enforced. However, couplings on rigid metal conduits are not sealed and allow water entry from the elevated water pressure that exists around a buried conduit. Additionally, above ground ducts/conduit systems also tend to retain all infiltrated water. The most common way to avoid standing water in conduits is grading, where the conduit is sloped to a drain point. However, in areas of high water table, the drain point allows water to flow back in the conduit/duct from the intended drain point. The layout of the conduit/duct can also interfere with draining when there are elbows or fittings that are intended to provide a continuous enclosed path from buried depth to the surface. Additionally, storming conditions or flooding can allow water to enter conduits/ducts from their end points.

Keeping the water out through the use of heat or chemicals is also not practical and does not work. Heat and chemicals are expensive and often impractical or wasteful. Chemicals can be added to the conduit to suppress the freezing point of the water, similar to anti-freeze. However, chemicals must be approved for use with the conductor insulation and monitored against dilution over time must be assured. Further, with heated ducts/conduits temperatures must be controlled and monitored to prevent insulation damage and allow the full capacity of the conductor to be achieved.

Displacing the freezing water with another material, such as expanded or blown in beaded foam, has been tried. Expanding foam tends to expand around the conductors and will prevent the change out of the conductor following a failure. Beaded foam will displace the water but will not withstand flowing water which can occur in a conduit/duct.

Thus, the need exists for solutions to the above problems with the prior art.

SUMMARY OF THE INVENTION

A primary objective of the present invention is to provide devices, systems and methods to prevent damage to power and communication conductors located in cold occurring regions, with an elongated cylindrical tubular assembly of closed cell foam within an outer non-conductive durable outer coating along with communication and power lines along with a pull cord extending therethrough is pulled through new ducts and conduits, in order to reduce the volume spacing in the ducts/conduits that can be damaged by water intrusion which expands during freeze conditions.

A secondary objective of the present invention is to provide devices, systems and methods to prevent damage to power and communication conductors located in cold occurring regions, with an elongated cylindrical tubular assembly of closed cell foam within an outer non-conductive durable outer coating, with a pull cord extending therethrough, wherein the assembly along with power and communication lines is pulled through the retrofitting of existing power and communication ducts, so that the assembly reduces the volume spacing in the ducts/conduits that can be damaged by water intrusion which expands during freeze conditions.

A third objective of the present invention is to provide devices, systems and methods to provide a simple and inexpensive method of freeze damage protection and to avoid outages and repair costs as well as reducing the increased costs required for spare or redundant duct additions to assure reliability for power and communication conductors located in cold occurring regions. Increased reliability brings increased health and safety benefits where communication infrastructure failures can isolate and delay emergency responders. In extreme cold seasons power infrastructure failures can interrupt heat sources that can lead to a freeze up of a home within eight hours, or disrupt businesses, traffic control lights and other processes that rely on a reliable electric supply.

A system for preventing freeze damage in power and communication ducts and conduits, can include at least one elongated closed cell foam core within a durable outer coating and a pull line extending therethrough, a pull end protruding from one end, at least one conductive cable within a sleeve, with a pull end protruding from one end, the at least one elongated closed cell foam core with durable coating being placed side by side with the at least one conductive cable within a sleeve, with the pull ends of each adjacent to one another, and a cable puller for pulling the adjacent pull ends of both the at least one elongated closed cell foam core with outer coating, and the at least one conductive cable within a sleeve through conduit, wherein the at least one elongated closed cell foam within durable outer coating reduces volume spacing in the conduit that is subject to being damaged by water intrusion which expands during freeze conditions.

The conduit can be a new communication and power conduit to be installed in regions subject to freeze conditions.

The conduit can be an existing communication and power conduit to be retrofitted in regions subject to freeze conditions.

The conductive cable in the sleeve can include a power cable. The conductive cable in the sleeve can include a communications cable. The conductive cable in the sleeve can include metal conductors. The conductive cable in the sleeve can include optical fibers.

The closed cell foam can include a compressive material and a pull rope.

The durable outer coating can include an non-water absorbing material that is abrasion resistant if needed to augment the performance of the core compressible material.

The cable puller can include a pulley.

A method for preventing damage to communication and power cables during freeze conditions, can include the steps of providing a conduit in regions subject to freeze conditions, providing at least one elongated closed cell foam core within a durable outer coating and a pull line extending therethrough, a pull end protruding from one end, providing at least one conductive cable within a sleeve, with a pull end protruding from one end, positioning the at least one elongated closed cell foam core with durable coating being placed side by side with the at least one conductive cable within a sleeve, with the pull ends of each adjacent to one another, pulling the adjacent pull ends of both the at least one elongated closed cell foam core with outer coating, and the at least one conductive cable through the conduit, and reducing volume spacing in the conduit subject to being damaged by water intrusion which expands during freeze conditions.

The method can include the step of installing the conduit as a new conduit in northern temperate, sub-arctic and arctic regions.

The method can include the step of retrofitting an existing conduit in northern temperate, sub-arctic and arctic regions.

The step of providing at least one conductive cable within a sleeve can include the step of providing a power cable as the at least one conductive cable.

The step of providing at least one conductive cable within a sleeve can include the step of providing a communications cable as the at least one conductive cable.

The step of providing at least one conductive cable within a sleeve can include the step of providing a metal conductor as the at least one conductive cable.

The step of providing at least one conductive cable within a sleeve can include the step of providing an optical fiber as the at least one conductive cable.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.
1. VDCF device(s)
10 non-conductive durable outer coating
20 compressible material, such as closed cell foam
30 pull cord/rope
40 loop end
50 communication/power cables/conductors with or without cover sleeve
54 capped/crimp end
56 pull line
58 eyelet end
60 conduit/duct
70 trench
75T thawed backfill
75F frozen backfill
100 pulling head
110 main pull line
120 pulleys
130 mechanical cable puller
140 main spool
150 inlet box/vault
160 outlet box/vault
W water
FW frozen water or ice The invention allows for water to enter and remain in the conduit/duct in the presence of a compressible material originally installed with the conductors The compressible material is sized to provide adequate water-to-ice volume donation within the duct/conduit (approximately 20% to approximately 25% of void space). This volume donation by the inert, non-conductive and compressible material inexpensively provides duct/conduit/vault freeze protection by donating all necessary volume through soft material compression. With the necessary volume donation available, conduit/duct/vault pressure remains static and damage is prevented during the freeze cycle.

Testing included the use of a closed cell foam backer rod made by: Backer Rod Mfg. Inc. 4244 N Broadway, Denver Colo. 80216 The foam was placed in the interstitial area of the cable assembly. The foam was taped onto the conductors prior to placement in the conduit. While pulling the assembly into the conduit, the foam would sometimes hang up on the throat of the conduit and tear which would cause bunching inside the conduit making the installation method tedious and time consuming.

After several installations, it was determined to modify the compressible foam material to aid in the ease of installation. Two major changes were implemented: 1) The installation of a pull rope inside the compressible foam, and 2) The addition of an outer sheath to increase the exterior toughness during installation and to decrease the potential for water penetration and saturation of the inner compressible foam core.

In the event of a conductor failure in the conduit/duct system, (presumably by other causes not related to freezing) the entire cable assembly including the interstitial compression material can be removed from the conduit and reinstalled without replacement or modification of the conduit/duct system.

Figure 1:
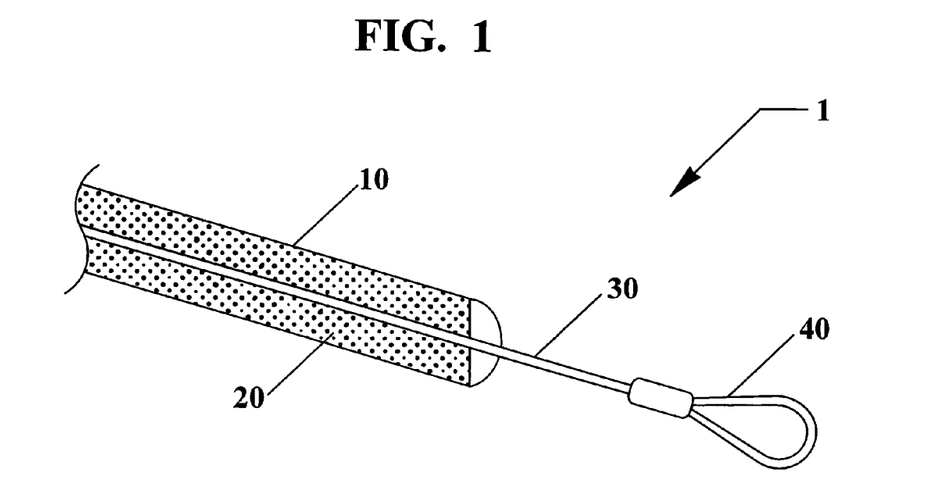
FIG. 1 is a perspective view of a Volume Donating Compressible Filler (VDCF) device with pulling cord with a partially exposed side.
Figure 2:
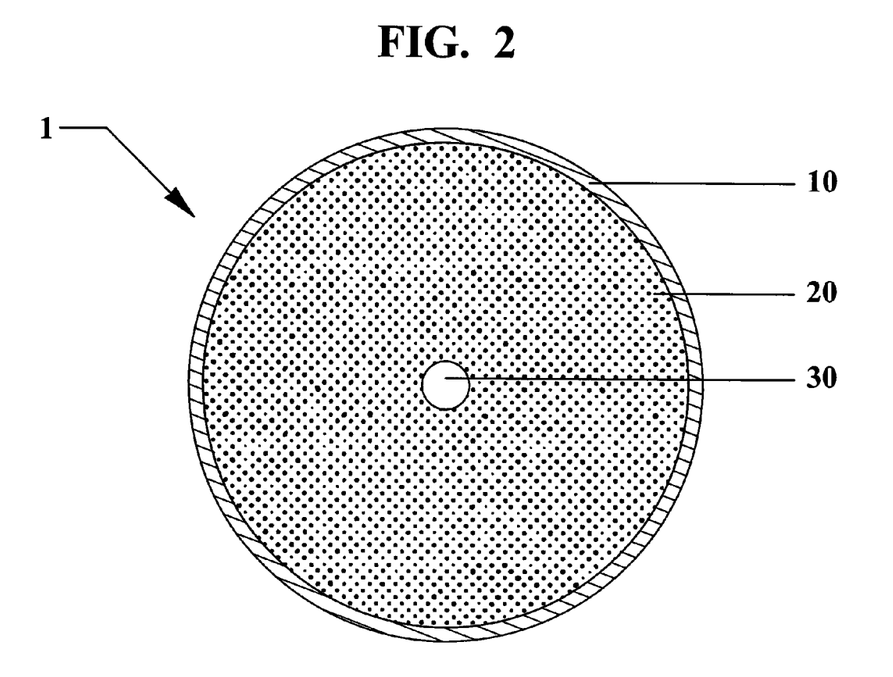
FIG. 2 is a cross-sectional view of the VDCF device of FIG. 1.

FIG. 1 is a perspective view of a Volume Donating Compressible Filler (VDCF) device 1 with pulling cord 30 with a partially exposed side. FIG. 2 is a cross-sectional view of the VDCF device 1 of FIG. 1. Referring to FIGS. 1-2, the VDCF device 1 can include a non-conductive durable outer coating 10, that surrounds a closed cell foam 20, with a pull cord 30 extending therethrough, and a loop end 40.

Figure 3:
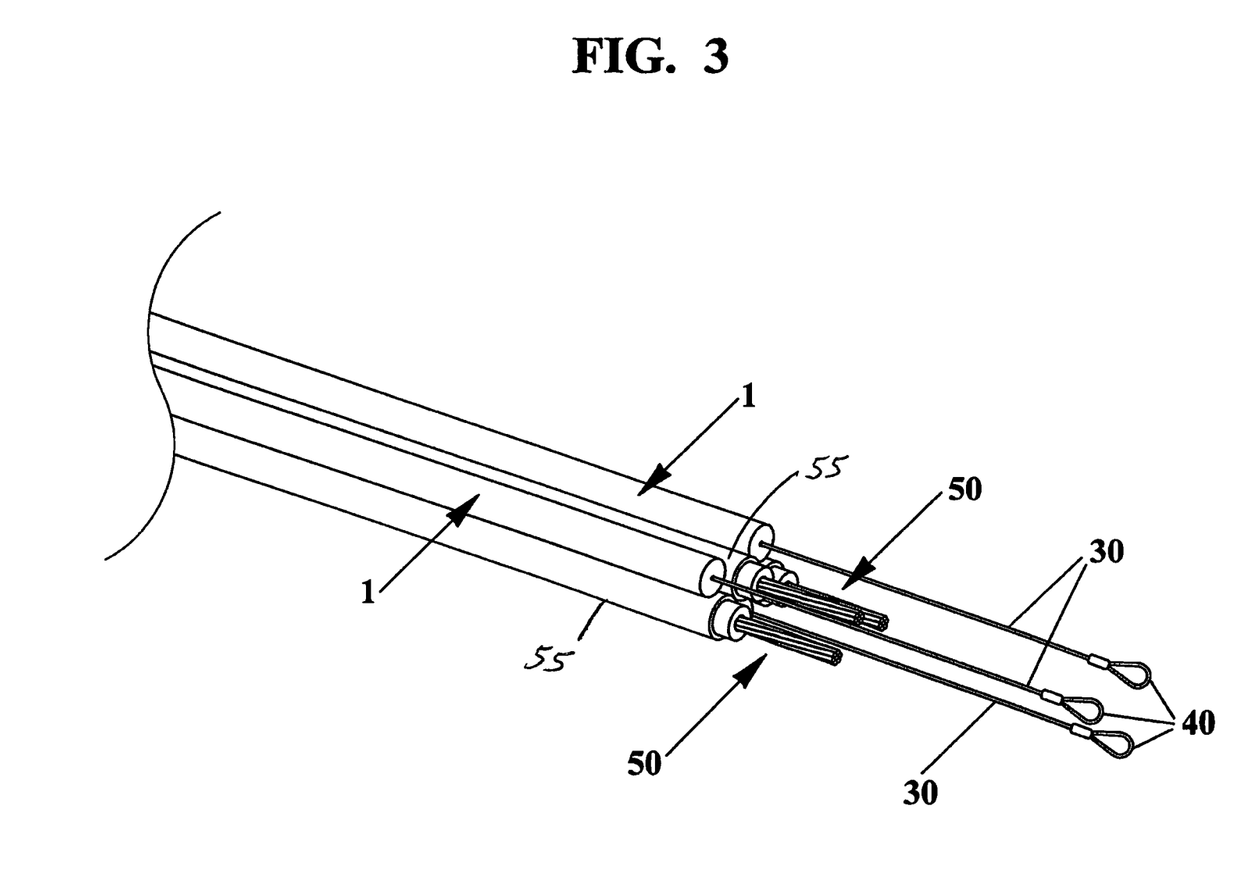
FIG. 3 is a perspective view of plural VDCF devices of FIGS. 1-2 adjacent to communication and power conductor cables.

FIG. 3 is a perspective view of plural VDCF devices 1 of FIGS. 1-2 adjacent to communication and power conductor cables 50. A plurality of VDCF devices 1 can be arranged side by side about communication and power cables 50. In this application, three VDCF devices 1 can be arranged about three communication and power cables 50.

Figure 4:
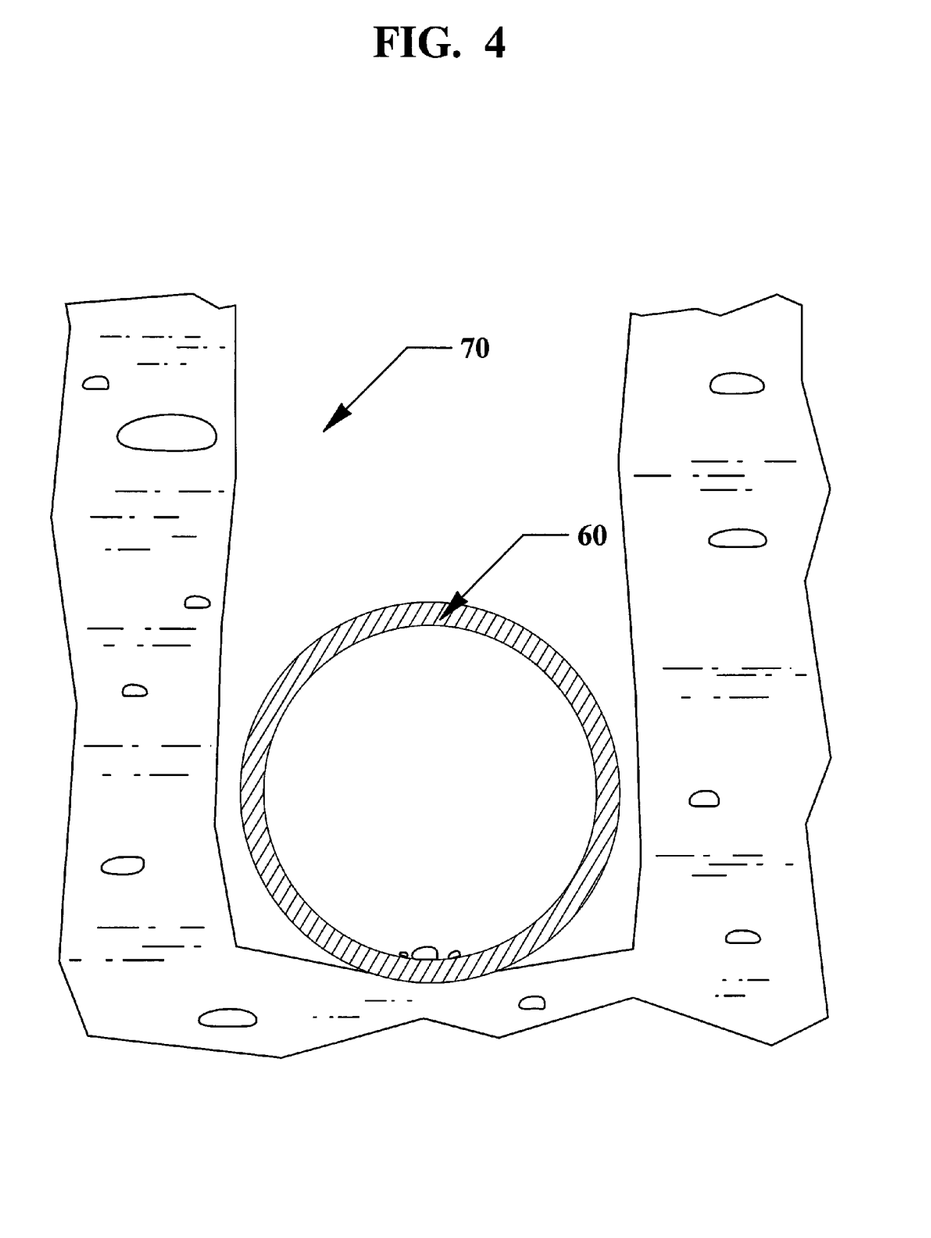
FIG. 4 is a front cutaway view of a conduit/duct at the bottom of a freshly excavated trench.

FIG. 4 is a front cutaway view of a conduit/duct 60 positioned at the bottom of a freshly excavated trench 70, before installation of the novel VDCF devices along with the communication and power cables 50.

Figure 5:
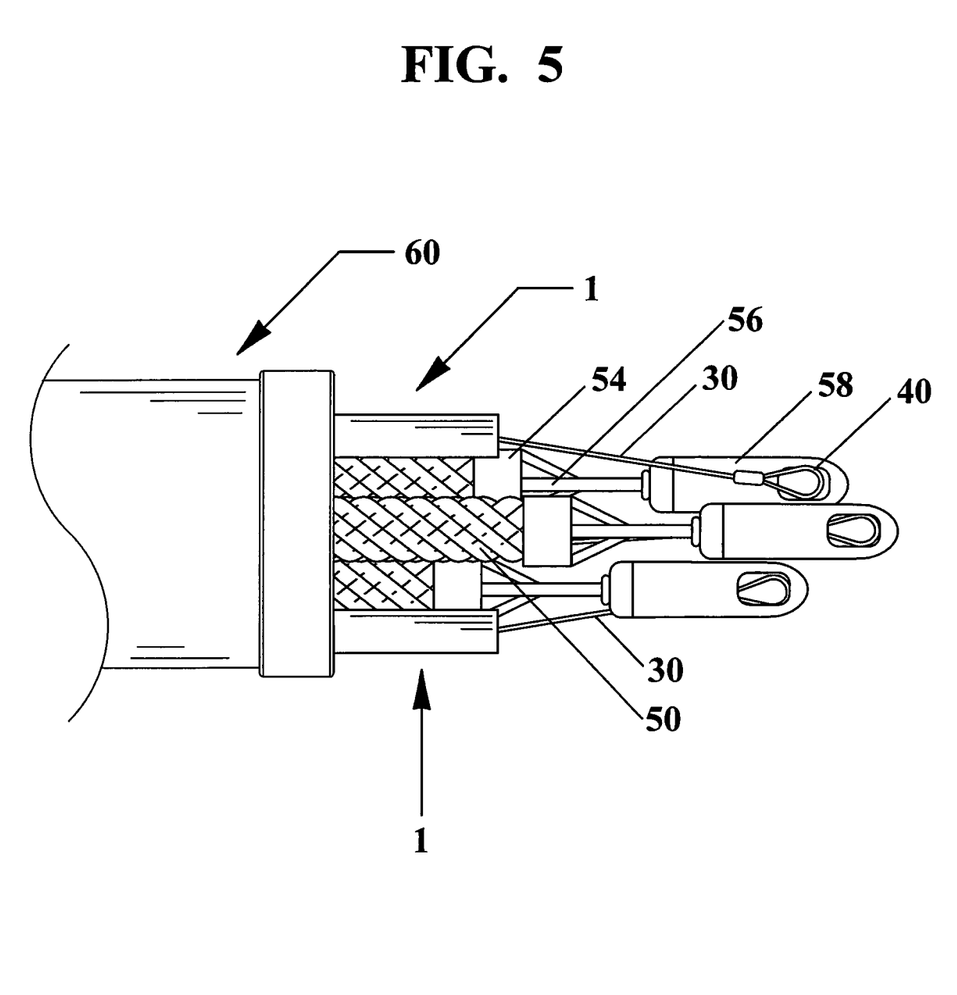
FIG. 5 is a side view of the VDCF devices and communication/power conductor cables from FIG. 3 in the conduit/duct of FIG. 4.
Figure 6:
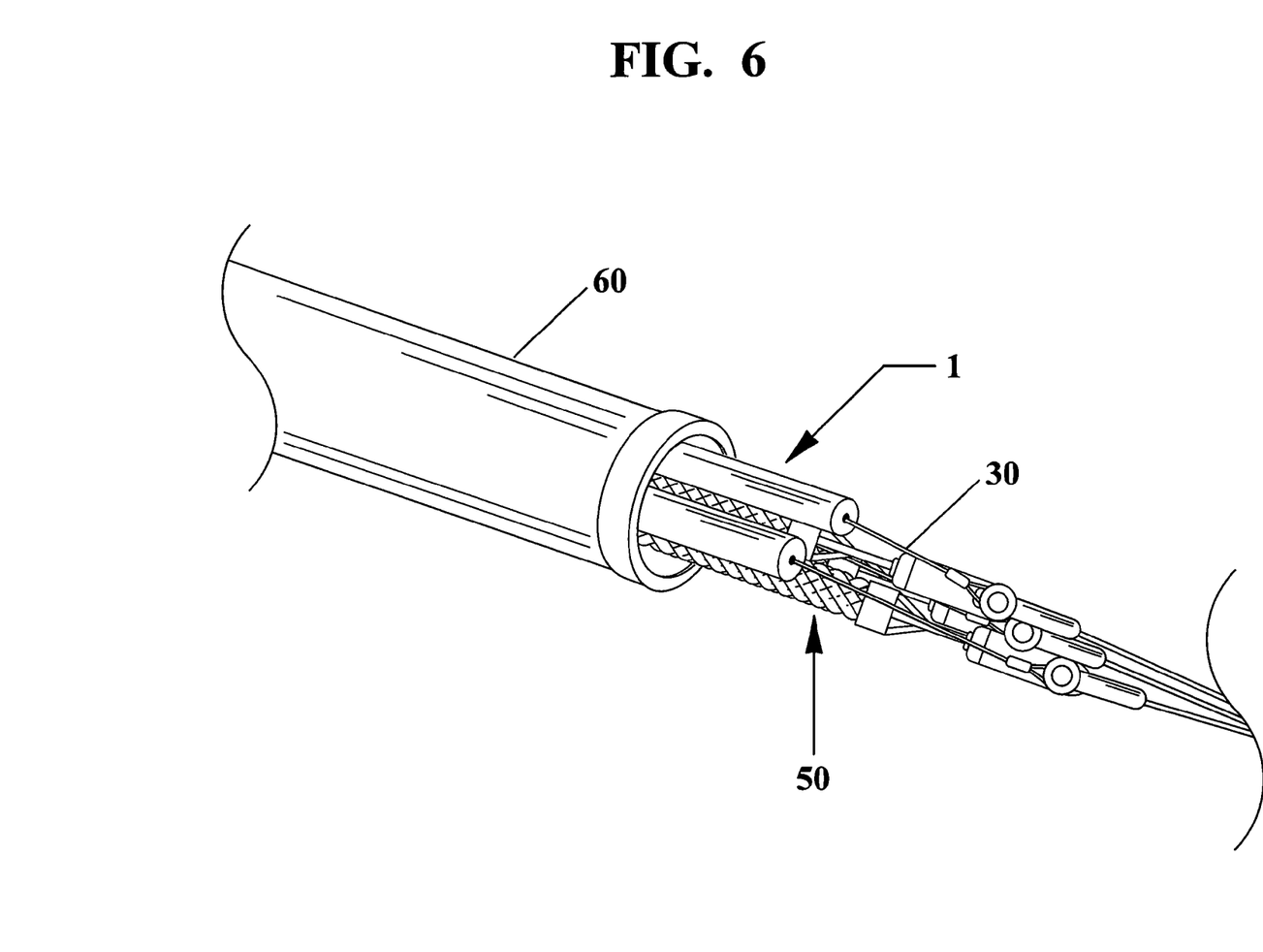
FIG. 6 is a perspective view of the VDCF devices and conductor cables of FIG. 5 being pulled through the conduit/duct with pulling eyes.

FIG. 5 is a side view of the VDCF devices 1 and communication/power conductor cables 50 from FIG. 3 in the conduit/duct 60 of FIG. 4. In this application the communication and power cables 50 can have capped ends 54 with pull lines 56 and eyelet ends 58. FIG. 6 is a perspective view of the VDCF devices 1 and power and communication cables 50 of FIG. 5 being pulled through the conduit/duct with pulling eyes 58.

Figure 7:
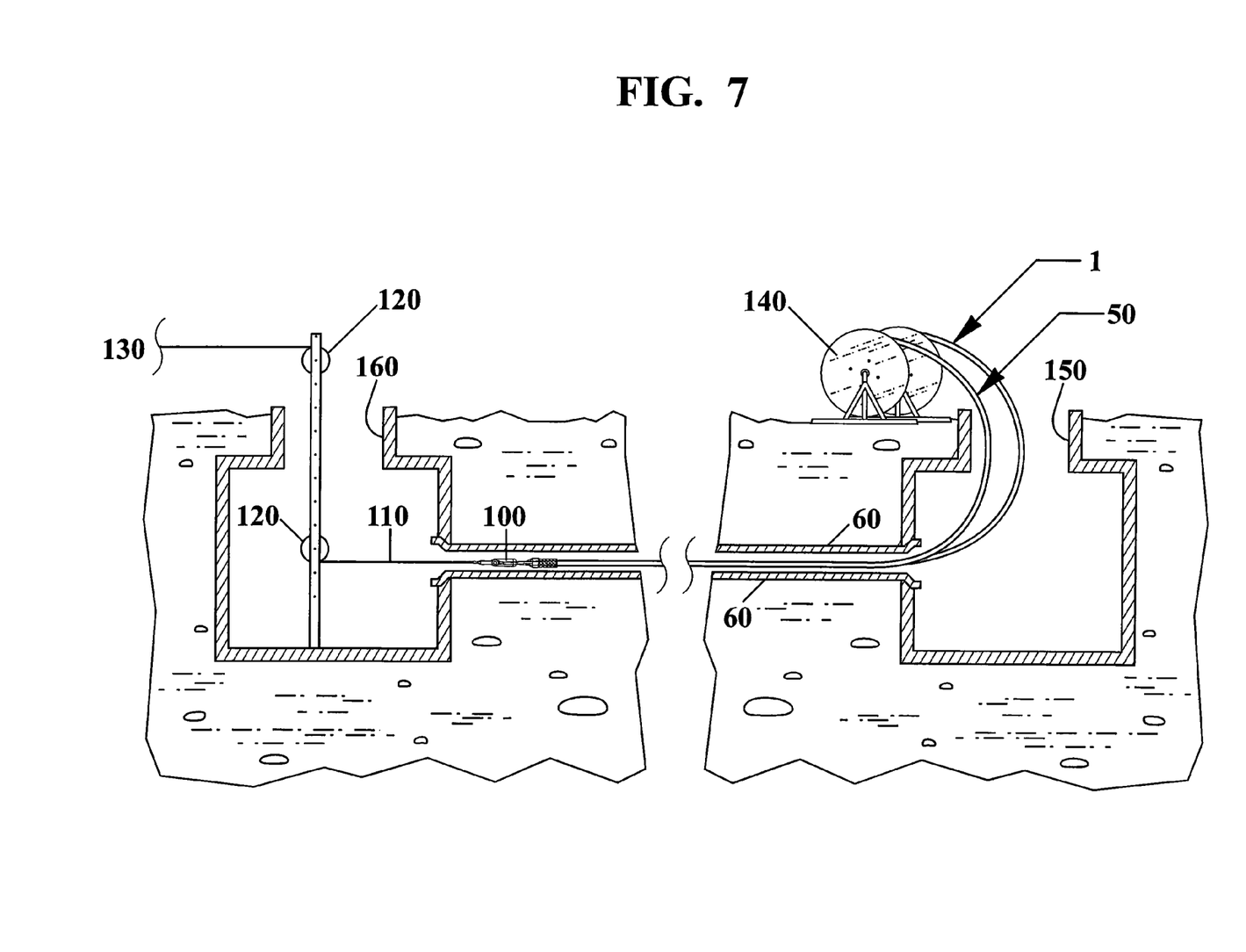
FIG. 7 is a side view of the VDCF devices and communication/power conductor cables of FIGS. 5-6 being installed in the conduit/duct of FIG. 4.

FIG. 7 is a side view of the VDCF devices 1 and communication/power conductor cables 50 of FIGS. 5-6 being installed in the conduit/duct of FIG. 4. The VDCF devices 1 and communication and power cables 50 can initially be positioned on a spool 140 adjacent to an inlet box/vault 150 where the duct/conduit 60 begins. A mechanical cable puller 130 such as a motor drum can be located adjacent to an outlet box/vault 160, which can be attached to one end of a main pull line 110 which passes about pulleys 120 to a pulling head 100 which can be attached to eyelet ends 58 of communication/power cables 50 and loop ends 40 on pull cords of the VDCF devices 1.

A method of installing the novel VDCF devices 1 along with the power and communication cables 50 will now be described in reference to FIGS. 1-7.

Installation Method Steps:

The following installation method steps allow for installation of below grade conduits/ducts and subsequent installation of conductors within that conduit.
 1. Excavate the trench for the conduit/duct.
 2. Assemble sections of the conduit/duct.
 3. Place the assembled conduit/duct into the trench.

4. Backfill and compact the conduit/duct with excavated or select materials as appropriate for local conditions.
5. Pig the conduit to remove debris.
6. Blow in a small pull line.
7. Use the small pull line to pull in a full tension pull rope.
8. Place conductor spools on rollers, one per conductor and one for each compressible volume donator run.
9. Connect all conductors and each compressible volume donator run to the pulling head or full tension pull rope.
10. While slowly pulling the full tension rope, bundle the conductors and compressible volume donating material into an assembly and feed the complete assembly into the throat of the conduit.
11. Conductor lubricants may be used to reduce pulling tension as is typical or as required.
12. Continue pulling the assembly into the conduit/duct until the full tension pull rope and adequate conductors and volume donating material is clear of the installed conduit end with adequate lengths as required for connections.
13. Disconnect the full tension pull rope.
14. Terminate the conductors.

Figure 8:
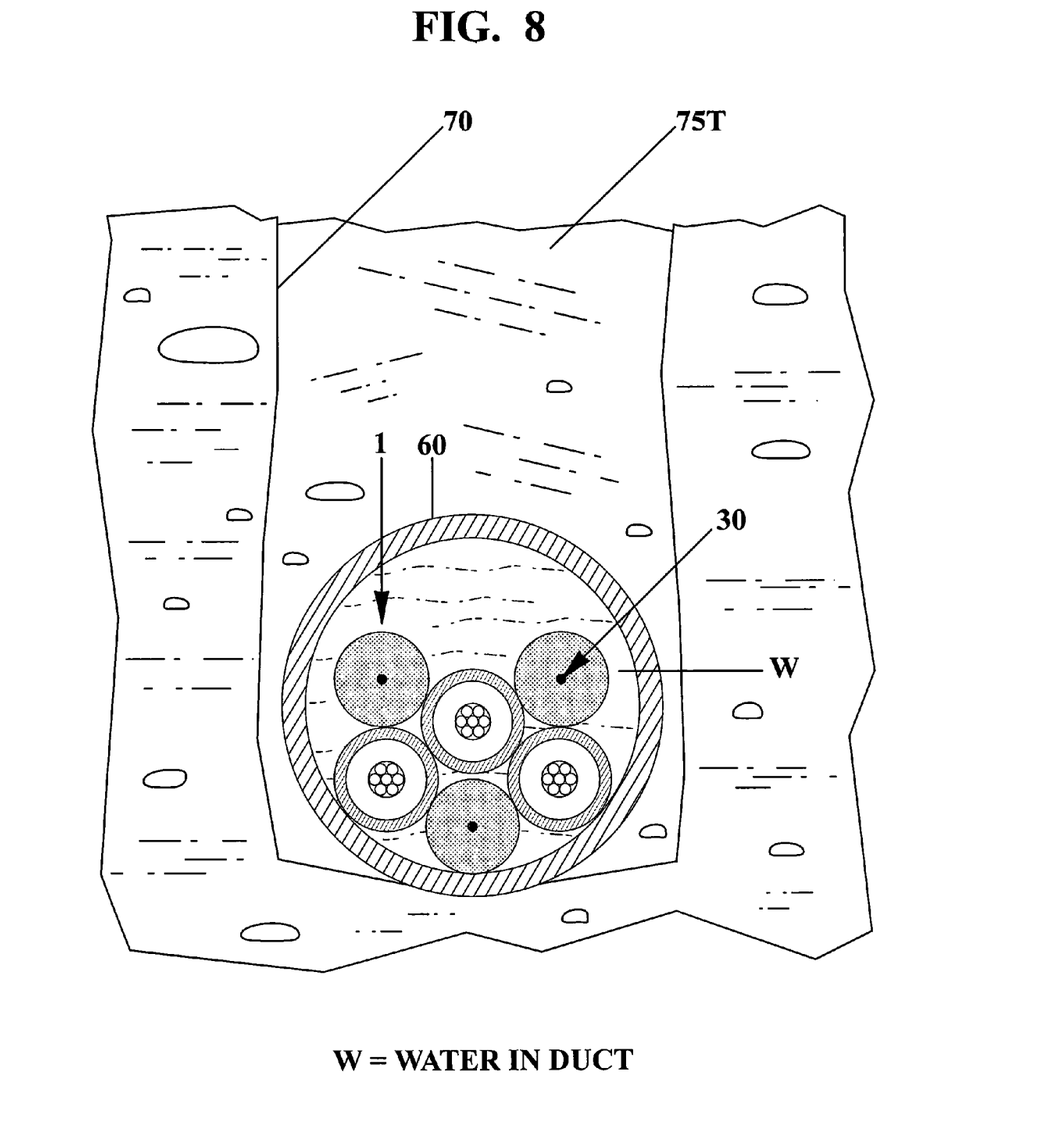
FIG. 8 is a cross-sectional view of the installed VDCF devices and communication/power conductor cables of FIGS. 5-7 installed in the water filled conduit/duct surrounded with compacted fill.

FIG. 8 is a cross-sectional view of the installed VDCF devices 1 and communication/power conductor cables 50 of FIGS. 5-7 installed in the conduit/duct 60 with thawed compacted fill 75T.

Figure 9:
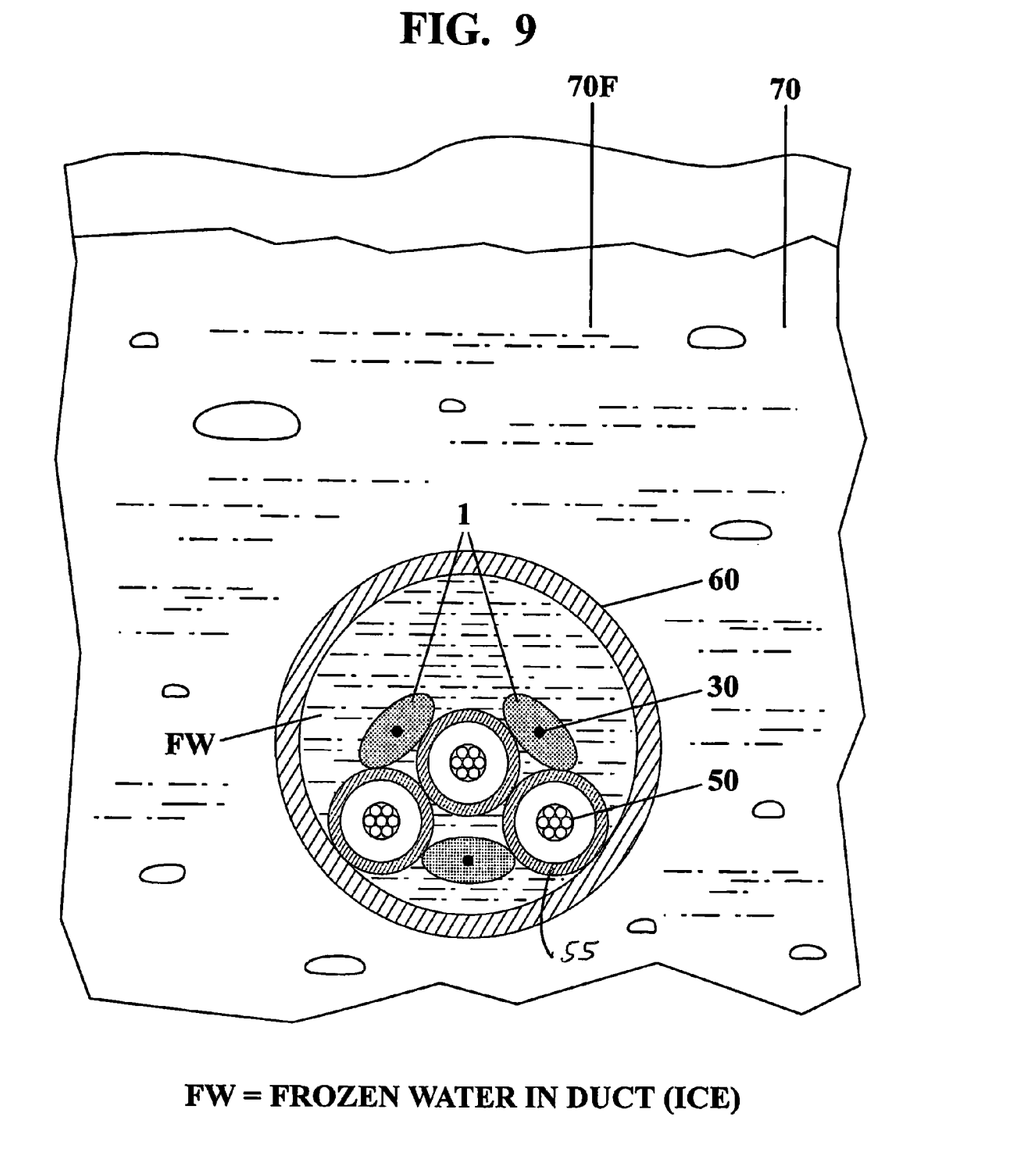
FIG. 9 is another cross-sectional view of the installed VDCF devices and communication/power conductor cables installed in the conduit/duct of FIG. 8 surrounded by frozen compacted fill and water inside of the conduit/duct that is now frozen to expand against and compress the VDCF devices.

FIG. 9 is another cross-sectional view of the installed VDCF devices 1 and communication/power conductor cables 50 installed in the conduit/duct 60 of FIG. 8 with frozen compacted fill 75F and Frozen Water (FW) inside of the conduit/duct 60 frozen to expand against and compress sides of the VDCF devices 1. As shown the VDCF devices 1 can compress, for example, in an elliptical shape, to take up a percentage of the volume being displaced by the expanding frozen water.

An exemplary conduit freezing filler calculation is shown below.

Table 1 shows the inside diameter (ID) of several common sizes of Schedule 40 rigid metal conduit. For the following example a 3 inch rigid metal conduit with an ID of 3.068 inches is selected to hold the three 15 kilovolt 1/0 awg copper conductor concentric neutral cables that each have an outside diameter (OD) of 1.125 inches. The ⅝ inch VDCF was selected from Table 2 with an integral ¼" pulling-line (p-line). The area of the ¼ inch p-line is subtracted from the area of the ⅝ inch compressive material to yield an effective compressive area for each VDCF of 0.2278 square inches.

The area of the conduit (ID=3.068") is computed to be 7.3927 square inches. Subtracting the three cables (OD=1.125") having a total area of 2.9821 square inches and the three VDCF (ID=0.594") that have a total area of 0.8314 square inches, yields a remaining potential water area of 3.5792 square inches.

Using the 9.399% expansion coefficient of water on the 3.5792 square inch potential water area yields a required water expansion area of 0.3364 square inches. Using the compressive area for ⅝" VDCF with a ¼" p-line from Table 2 of 0.2278 square inches, each, yields a total compressive area of the three VDCF of 0.6834 square inches. Dividing the water expansion area of 0.3364 square inches by the total VDCF compressive area of 0.6834 square inches yields 0.4922 or 49.22% compression, which is within the recommended 50% compression for this material and will allow for rebound when the ice melts.

| Conduit(Schedule 40) | | Area |
| --- | --- | --- |
| ID" 3.068 | | 7.3927 sq. in. |
| Conductors | | |
| Total | OD" | |
| 3 | 1.125 | 2.9821 sq. in. |
| Filler | | |
| Total | OD" | Compress Area |
| 3 | 0.594" | 0.8314 sq. in. |
| Total Water Area | | 3.5792 sq. in. |
| Ice Expansion Percentage | | 9.399% |
| Ice Expansion Area | | 0.3364 sq. in. |
| VDCF Compression Area | | |
| 3 × 0.2278 sq.in. | | 0.6834 sq. in. |
| Percent Compression of Filler | | 49.22% (50% maximum) |

TABLE 1

Inside diameter (ID) of several common sizes of Schedule 40 rigid metal conduit.

| Table Size | ID Sched. 40 |
| --- | --- |
| ½ | 0.622 |
| ¾ | 0.824 |
| 1 | 1.049 |
| 1 & ¼ | 1.380 |
| 1 & ½ | 1.610 |
| 2 | 2.067 |
| 2 & ½ | 2.469 |
| 3 | 3.068 |
| 3 & ½ | 3.548 |
| 4 | 4.026 |
| 5 | 5.047 |
| 6 | 6.065 |

Table 1 shows the different inside diameters of a range of rigid metal conduits. Generally, the larger the cables or an increased number of cables will require a larger conduit. The maximum conduit fill is limited as a result of several factors in the electrical codes.

TABLE 2

Effective Compression Areas (square inches) for ⅝ filler with two different sized pull-lines (P-line)

| Filler with P-line core | | | Compressible |
| --- | --- | --- | --- |
| Filler | OD | P-line OD | Area |
| ⅝ | 0.594" | 0.25" | 0.2278 sq. in. |
| ⅝ | 0.594" | 0.375" | 0.1664 sq. in. |

Table 2 shows the reduction on compression area as the size of the p-line is increased. The size of the p-line should be sized as small as possible to maximize the compressible area of the VDCF.

The VDCF can be made from a material that is non-conductive, non-water absorbing, compressible and abrasion resistant. The size may vary from large to small depending on the application. As a practical matter the number of VDCF should be limited for ease of installation and the compression should be limited to a level that will allow for ready rebound to the original size upon thawing of the surrounding ice. For the example, three VDCF were installed with a compression of less than 50%. The core material can be non-water absorbing and abrasion resistant on its own and negate the need to the outer coating or could be strong enough to negate the need for a pull rope.

The number of VDCF sizes may be held to a minimum to help control inventory costs, but can have a diameter that will typically range from approximately 1/8" to approximately 1¼".

Alternative Materials for the core filler are described below:
Compressible Core Filler—
First Tier Closed Cell Foam:
NOMACO HBR Closed-cell foam Backer Rod
DESCRIPTION
Round, flexible, continuous lengths of extruded, closed-cell Polyethylene foam backer rod for use as a backing material for elastomeric and other cold applied sealants.
Sizes 1/8", 1/4", 3/8", 1/2", 5/8", 3/4" 7/8", 1", 1¼"
CERAMAR®
DESCRIPTION
CERAMAR is a flexible foam expansion joint filler composed of a unique synthetic foam of isomeric polymers in a very small, closed-cell structure. Gray in color, CERAMAR is a lightweight, flexible, highly resilient material offering recovery qualities of over 99%. The compact, closed-cell structure will absorb almost no water.
https://www.wrmeadows.com/ceramar-flexible-foam-expansion-joint/
Neoprene®
DESCRIPTION
Neoprene rubber foam, renowned for its ability to be soft and flexible, but still durable and reliable. It is highly resistant to many hazards, including ozone, sunlight, and oxidation, as well as many chemicals and water.
Second Tier Materials
Latex Rubber Based Tubing (Surgical Tubing)
Latex rubber tubing has many of the required properties, but is limited in its effectiveness as there is only one cell, the void in the inside of the tubing. A single breach of the tubing will compromise the entire installation.
Examples of the Outer Coating are Described Below—
Neoprene®
DESCRIPTION
Neoprene rubber foam, renowned for its ability to be soft and flexible, but still durable and reliable. It is highly resistant to many hazards, including ozone, sunlight, and oxidation, as well as many chemicals and water.
Polyethylene
Potential coatings include PTFE, PFA, TFE, Tefzel/ETFE and FEP, Krytox, Vydax, Silverstone, Xylan, Dykor, Castall, Halar, Emralon, Kynar, Electrofilm, Everlube, dry film lubricant and dielectric. Finishes include nonstick, non-wetting, heat resistant, chemical resistant and cryogenically stable to low temperatures. Coatings applied to a wide variety of substrates including metals, elastomers, composites, rubber, ceramics and glass.
Examples of the Pull Cord are Described Below—
NYLON ROPE
Shock absorbent. Recommended for securing boats, cargo and furniture.
Strong, abrasion resistant.
Flexible, easy to knot. Won't rot or mildew.
Solid Braided—Smooth. Works well in pulleys.
Twisted—General, all-purpose rope. Easy to grip and splice.
Double Braided—A rope within a rope. Extra strong for towing and anchor lines.
Kevlar®
Kevlar is the same material used in bullet proof vests, and Kevlar line is currently specified for the Navy SEALS survival kits.
The 200 lb Kevlar line is made of 3 twisted Kevlar strands.
When broken down, 60' of Kevlar 200 line produces 180' of Kevlar thread, with a break strength of approximately 60 lbs. This Kevlar thread can be used for sewing, fishing, or shelter building.
Kevlar line is also extremely heat resistant, allowing it to be used as a friction saw for cutting through flex cuff handcuffs and PVC pipe.
Spyderwire®
Dyneema® PE Microfiber construction is strong, smooth and round
Fluoropolymer Treated microfibers—shoots through guides like a bullet!
SpiderWire Stealth® is made from Dyneema®, The World's Strongest Fiber! Available in Moss Green for low-visibility underwater, Hi-Vis Yellow for visibility above water, or NEW Translucent for high visibility above water, and less visibility below. Constructed to provide ultimate strength with the thinnest diameter for smooth and quiet performance.
The no stretch properties of Dyneema PE The term "approximately" can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A system for preventing freeze damage in power and communication ducts and conduits, comprising:
at least one elongated closed cell foam core within a durable outer coating and a pull line extending therethrough, a pull end protruding from one end;
at least one conductive cable within a sleeve, with a pull end protruding from one end, the at least one elongated closed cell foam core with the durable coating being placed side by side with the at least one conductive cable within the sleeve, with the pull ends of each adjacent to one another; and
a cable puller for pulling the adjacent pull ends of both the at least one elongated closed cell foam core with the durable outer coating, and the at least one conductive cable within the sleeve through a conduit, wherein the at least one elongated closed cell foam within the durable outer coating reduces volume spacing in the conduit that is subject to being damaged by water intrusion which expands during freeze conditions.

2. The system of claim 1, wherein the conduit is a new communication and power conduit to be installed in regions subject to freeze conditions.

3. The system of claim 1, wherein the conduit is an existing communication and power conduit to be retrofitted in regions subject to freeze conditions.

4. The system of claim 1, wherein the conductive cable in the sleeve includes a power cable.

5. The system of claim 4, wherein the at least one elongated closed cell foam core includes a compressible material and the durable outer coating includes:
   a non-water absorbing material that is abrasion resistant to augment the performance of the at least one elongated closed cell foam core compressible material.

6. The system of claim 1, wherein the conductive cable in the sleeve includes a communications cable.

7. The system of claim 1, wherein the conductive cable in the sleeve includes metal conductors.

8. The system of claim 1, wherein the conductive cable in the sleeve includes optical fibers.

9. The system of claim 1, wherein the closed cell foam core includes:
   a compressive material and a pull rope.

10. The system of claim 1, wherein the cable puller includes a pulley.

\* \* \* \* \*